United States Patent
Pei (10) Patent No.: US 9,575,215 B2
(45) Date of Patent: Feb. 21, 2017

(54) METHOD FOR MAKING LIGHT BLOCKING PLATE

(71) Applicant: Shao-Kai Pei, New Taipei (TW)

(72) Inventor: Shao-Kai Pei, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 930 days.

(21) Appl. No.: 13/873,161

(22) Filed: Apr. 29, 2013

(65) Prior Publication Data

US 2013/0251898 A1    Sep. 26, 2013

Related U.S. Application Data

(62) Division of application No. 12/859,264, filed on Aug. 19, 2010, now Pat. No. 8,459,808.

(30) Foreign Application Priority Data

Apr. 28, 2010  (TW) ............................... 99113389 A (51) Int. Cl.
| | | |
|---|---|---|
| B29D 11/00 | (2006.01) | |
| B44C 1/22 | (2006.01) | |
| B05D 5/06 | (2006.01) | |
| G02B 27/00 | (2006.01) | |
| G02B 1/10 | (2015.01) | |
| G02B 5/00 | (2006.01) | |
| G02B 5/20 | (2006.01) | |

(52) U.S. Cl.
CPC ................ *G02B 1/10* (2013.01); *G02B 5/005* (2013.01); *G02B 5/208* (2013.01); *G02B 27/0018* (2013.01)

(58) Field of Classification Search
CPC .................................................. G02B 27/0018

USPC ........................................................... 216/52
See application file for complete search history.

(56) References Cited

U.S. PATENT DOCUMENTS

| | | | | |
|---|---|---|---|---|
| 8,883,021 | B2 * | 11/2014 | Chang ................. | B81C 1/00214 |
| | | | | 216/13 |
| 2006/0276034 | A1 * | 12/2006 | Blanchard ......... | H01L 21/76802 |
| | | | | 438/672 |
| 2010/0099100 | A1 * | 4/2010 | Zaccarin ............. | G01N 21/253 |
| | | | | 435/6.11 |

(Continued)

FOREIGN PATENT DOCUMENTS

| | | |
|---|---|---|
| TW | 200701774 | 1/2007 |
| TW | 200928573 | 7/2009 |

OTHER PUBLICATIONS

Chen et al. ("Electromagnetic interference shielding properties of silicon nitride ceramics reinforced by in situ grown carbon nanotubes", Ceramics International, vol. 41, Issue 2, Part A, Mar. 2015, pp. 2467-2475).*

*Primary Examiner* — Thomas Pham
(74) *Attorney, Agent, or Firm* — Zhigang Ma (57) ABSTRACT

An exemplary method for making a light blocking plate includes the steps of providing a flat plate-like light pervious member; forming a plurality of spaced ceramic power layers on the light pervious member; forming a light blocking layer over the light pervious member and side faces of the ceramic power layers; forming an electromagnetic shielding layer over the light blocking layer; removing top portions of the ceramic power layers with remaining portions of the ceramic power layers thus exposed; and removing the remaining portions of the ceramic power layers.

1 Claim, 12 Drawing Sheets

(56) References Cited

U.S. PATENT DOCUMENTS

2010/0221921 A1* 9/2010 Kwon ................ H01L 21/0337
438/699
2011/0257040 A1* 10/2011 Turner ................ B01J 19/0046
506/16

* cited by examiner

METHOD FOR MAKING LIGHT BLOCKING PLATE

CROSS-REFERENCE TO RELATED APPLICATION

This application is a divisional application of a commonly-assigned application entitled "LIGHT BLOCKING PLATE AND LENS MODULE HAVING SAME," filed on Aug. 19, 2010 with application Ser. No. 12/859,264. The disclosure of the above-identified application is incorporated herein by reference.

BACKGROUND

1. Technical Field

The present disclosure relates to optical imaging and particularly to a method for making a light blocking plate.

2. Description of Related Art

Lens modules are widely used in various portable electronic devices, such as mobile phones and personal digital assistants (PDAs). The lens modules of the portable electronic devices have undergone various stages of miniaturization. It is required that optical elements (e.g., a light blocking plate) used in the lens module must be accordingly miniaturized.

A typical light blocking plate is made by processing a plastic/metal tape by exposure and developing. The equipment used in the processing is very expensive, and the process is harmful to the environment. In addition, the thickness of the light blocking plate is generally larger than 30 μm. Such a light blocking plate may not meet the demand for the miniaturization of the lens module.

Therefore, what is needed is a new method for making a light blocking plate, which can overcome the above-mentioned problems.

DETAILED DESCRIPTION

Embodiments will be described with reference to the drawings.

Figure 1:
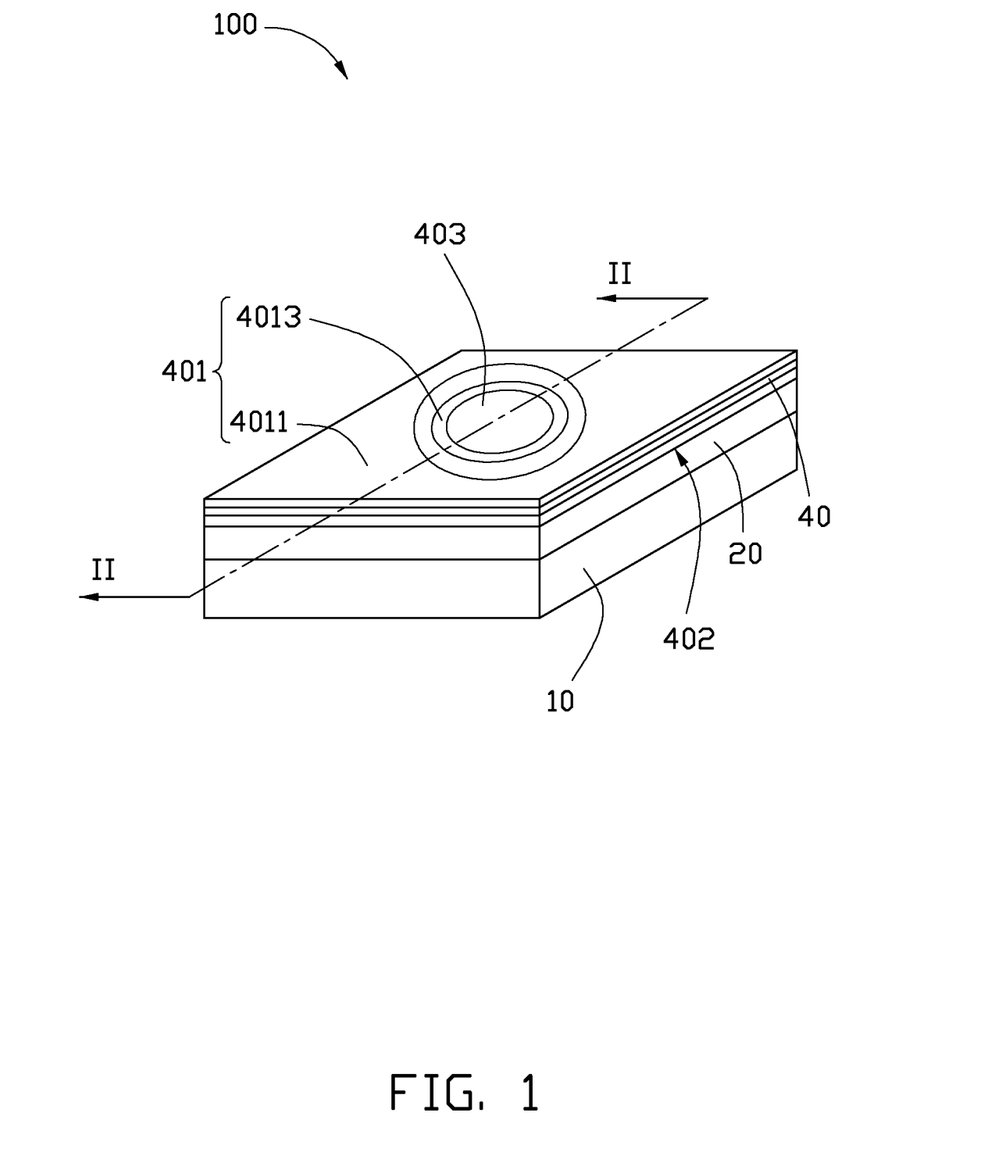
FIG. 1 is a schematic view of a light blocking plate according to a first embodiment.
Figure 2:
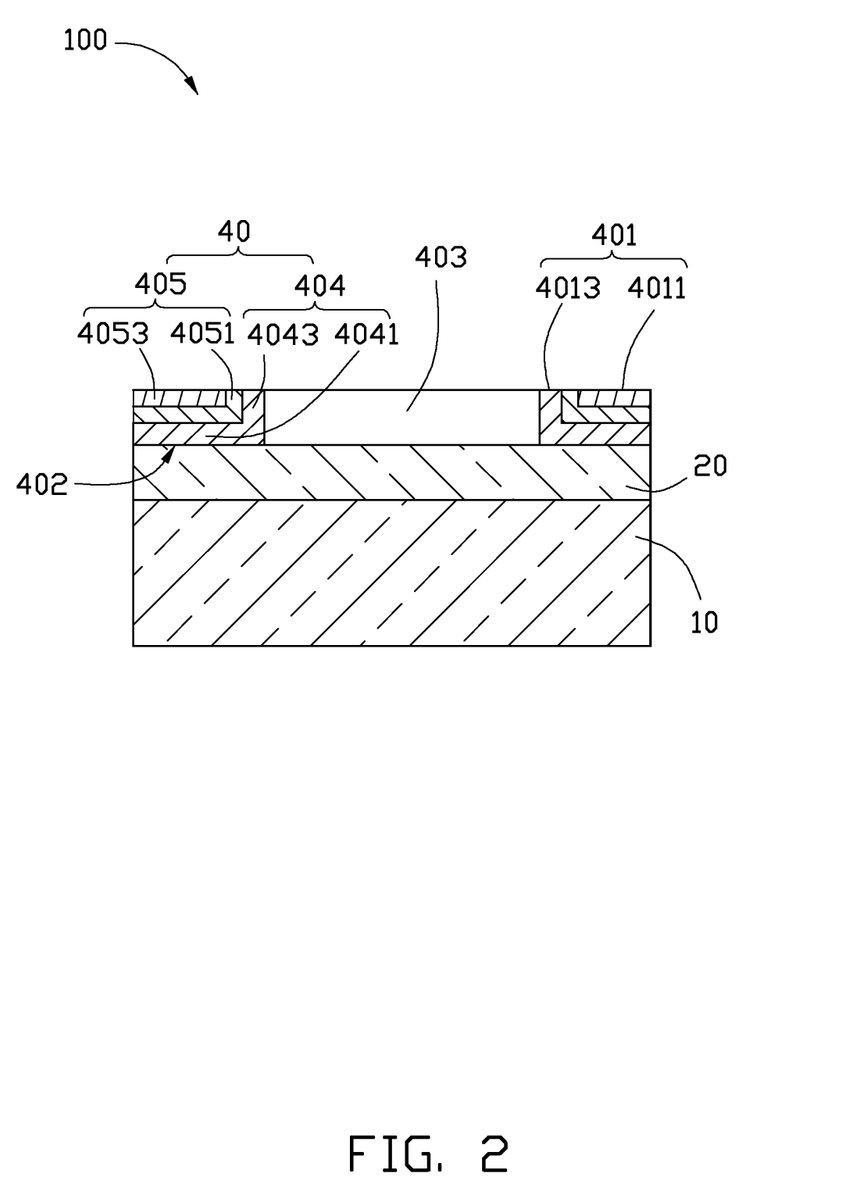
FIG. 2 is a schematic cross-section view of the light blocking plate taken along line II-II of FIG. 1.

Referring to FIGS. 1-2, a light blocking plate 100, in accordance with a first embodiment, is shown. The plate 100 includes a flat plate-like light pervious member 10, an optical filter film 20 formed on the member 10, and a blocking and shielding layer 40 formed on the filter film 20 for blocking light and protecting against the ingress of electromagnetic waves. In other embodiments, the filter film 20 may be omitted.

The member 10 is made of glass for allowing light to pass therethrough. In alternative embodiments, the member 10 may instead be made of plastic.

The filter film 20, in the illustrated embodiment, is an infrared cut-off optical filter film, and is sandwiched between the blocking and shielding layer 40 and the member 10.

The blocking and shielding layer 40 includes a top surface 401 facing away from the member 10, a bottom surface 402 facing the member 10, and a through hole 403 extending from the top surface 401 to the bottom surface 402. The blocking and shielding layer 40 includes a light blocking layer 404, and an electromagnetic shielding layer 405 having a first part 4011 of the top surface 401. The light blocking layer 404 includes a first portion 4041 having a bottom surface 402, and a second portion 4043 having a second part 4013 of the top surface 401, and extending from the first portion 4041 to the second part 4013 of the top surface 401. The electromagnetic shielding layer 405 surrounds the second portion 4043 of the light blocking layer 404, and the second portion 4043 of the light blocking layer 404 surrounds the through hole 403. In the present embodiment, the first portion 4041 is formed on the filter film 20.

The light blocking layer 404 absorbs stray light, thereby preventing the stray light from reaching the filter film 20. In the present embodiment, the light blocking layer 404 is made of chromium nitride. In alternative embodiments, the light blocking layer 404 may instead be made of chromium, titanium nitride, or the like.

The electromagnetic shielding layer 405 is configured for preventing external electromagnetic waves from interfering with the normal operation of an image sensor (not shown) under a lens module (described below). The electromagnetic shielding layer 405 is a multi-layered structure, and includes a copper layer 4051 formed on the light blocking layer 404, and a stainless steel layer 4053 formed on the copper layer 4051. The stainless steel layer 4053 is configured for not only shielding external electromagnetic field, but also preventing oxidation of the copper layer 4051, thereby preventing deterioration of electromagnetic shielding performance of the electromagnetic shielding layer 405. In an alternative embodiment, the electromagnetic shielding layer 405 may instead be a single-layered structure. In an alternative embodiment, the electromagnetic shielding layer 405 may instead be made of other electromagnetic shielding material, such as ferronickel alloy, electrically conductive plastic, surface conductive material, electrically conductive glass, or the like.

A method for making the light blocking plate 100 will be described in detail.

Figure 3:
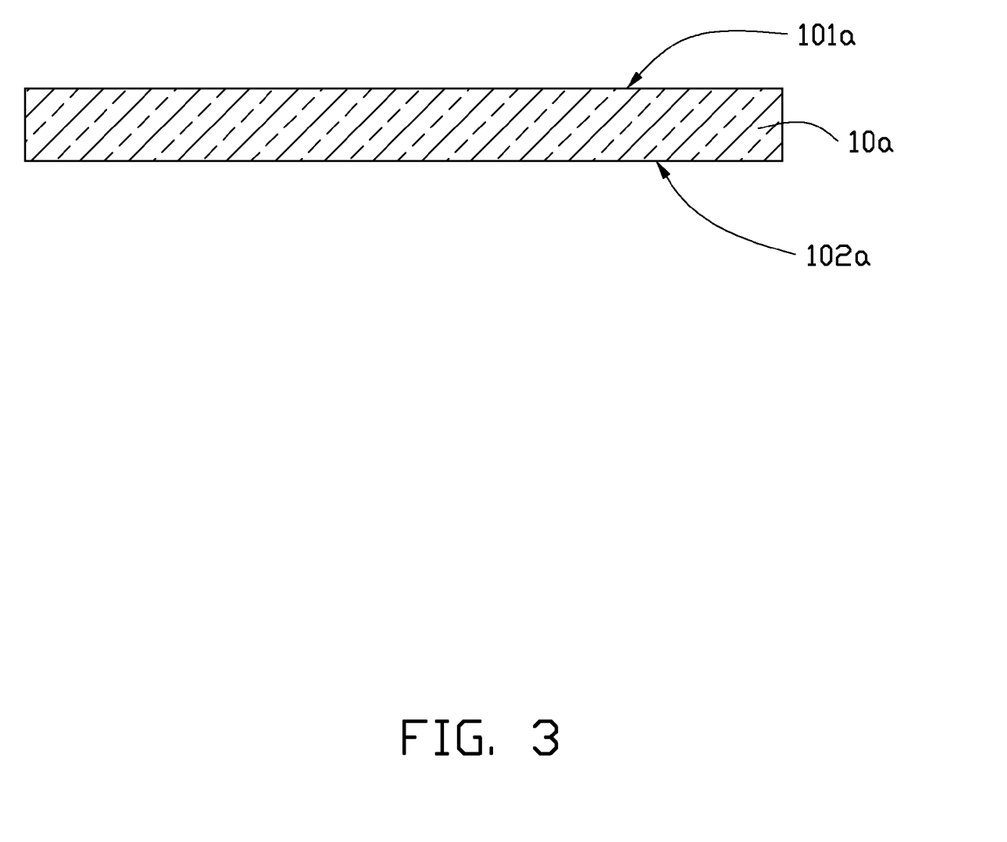
FIGS. 3-10 are cross-sectional views illustrating successive stages in a process for making the light blocking plate of FIG. 1.

Referring to FIG. 3, a flat plate-like light pervious member 10a is provided. The member 10a, in the illustrated embodiment, is made of glass, and includes a first surface 101a, and a second surface 102a opposite to the first surface 101a.

Figure 4:
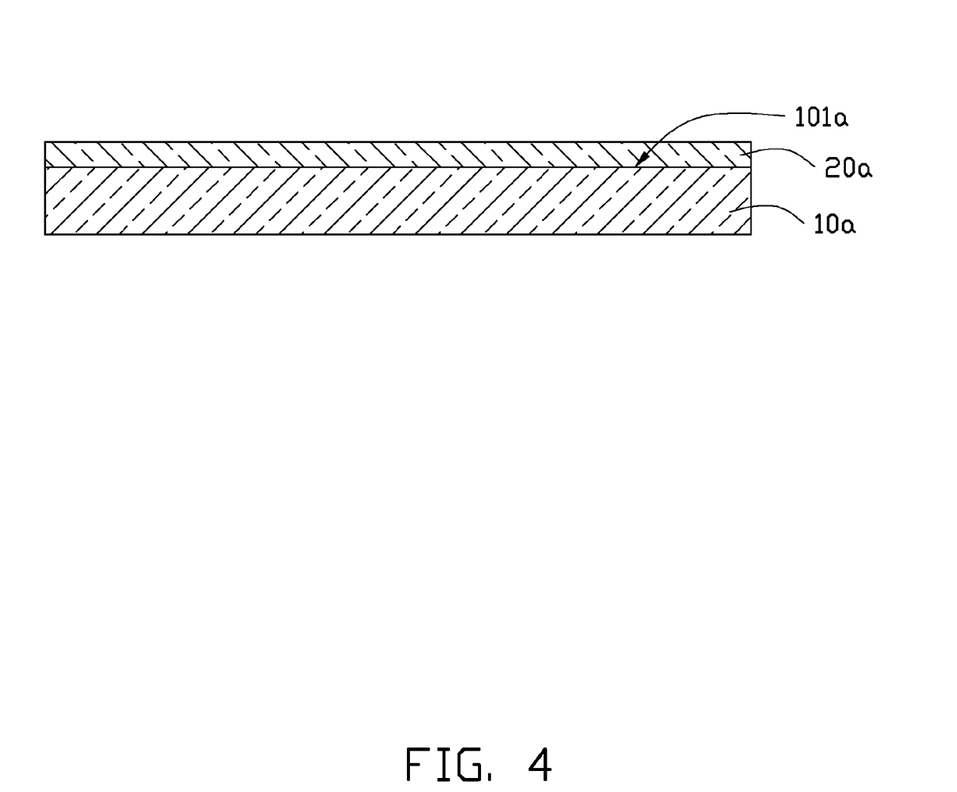

Referring to FIG. 4, an optical filter film 20a is formed on the first surface 101a of the member 10a. In the present embodiment, the filter film 20a is an infrared cut-off filter coating. In an alternative embodiment, the filter film 20a may instead be a low pass filter coating or an ultraviolet cut-off filter coating. In a further embodiment, the filter film 20a may be formed on the second surface 102a. In another embodiment, the filter film 20a may be omitted altogether.

Figure 5:
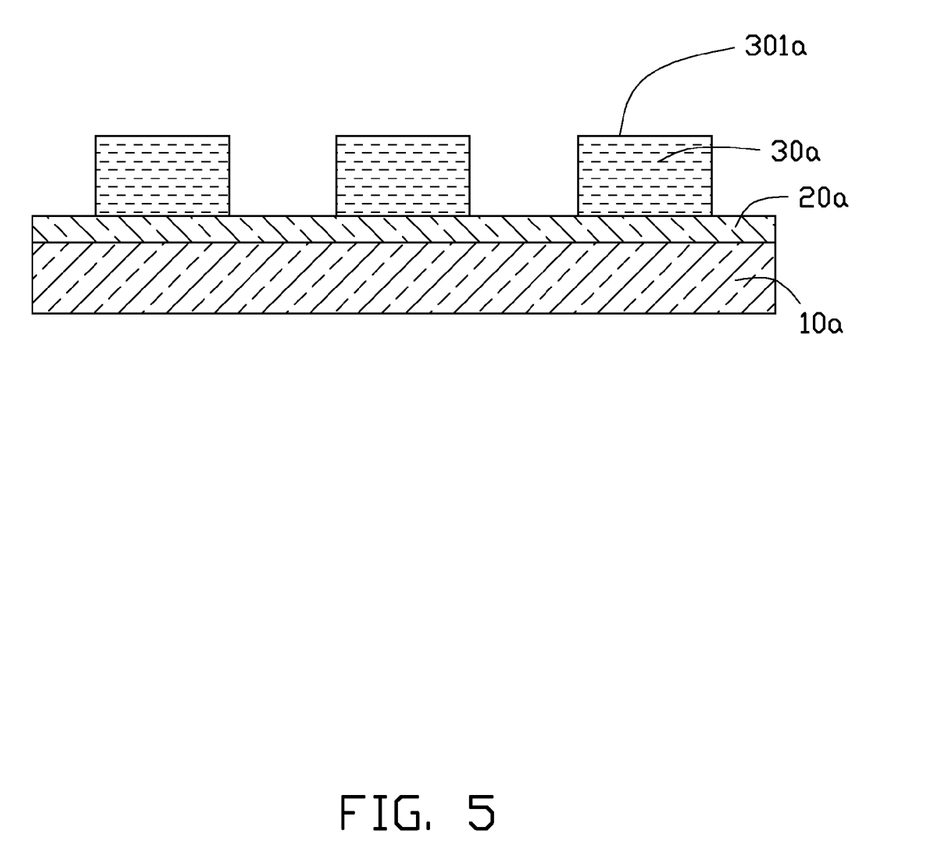

Referring to FIG. 5, a plurality of individual ceramic power layers 30a are formed on the filter film 20a. Each ceramic power layer 30a includes an upper surface 301a facing away from the member 10a. In the process of applying the ceramic power layers 30a on the filter film 20a, a plurality of individual ceramic power bodies (not shown) are first formed on the filter film 20a. Each ceramic power body is made of a composition of silicon dioxide, aluminum phosphate, and water. The composition includes silicon dioxide in an amount by weight from 40 percent to 45 percent, aluminum phosphate in an amount by weight from 5 percent to 10 percent, and water in an amount by weight from 45 percent to 50 percent. Then, the member $10a$ covered with the ceramic power bodies are disposed under a plurality of lasers (not shown) to cure the ceramic power bodies, thereby integrating the ceramic power bodies into the ceramic power layers $30a$. The curing temperature is in a range from 400 degrees Celsius to 800 degrees Celsius. In the present embodiment, the ceramic power bodies are formed on the filter film $20a$ by spin coating, and the curing temperature is 500 degrees Celsius.

Figure 6:
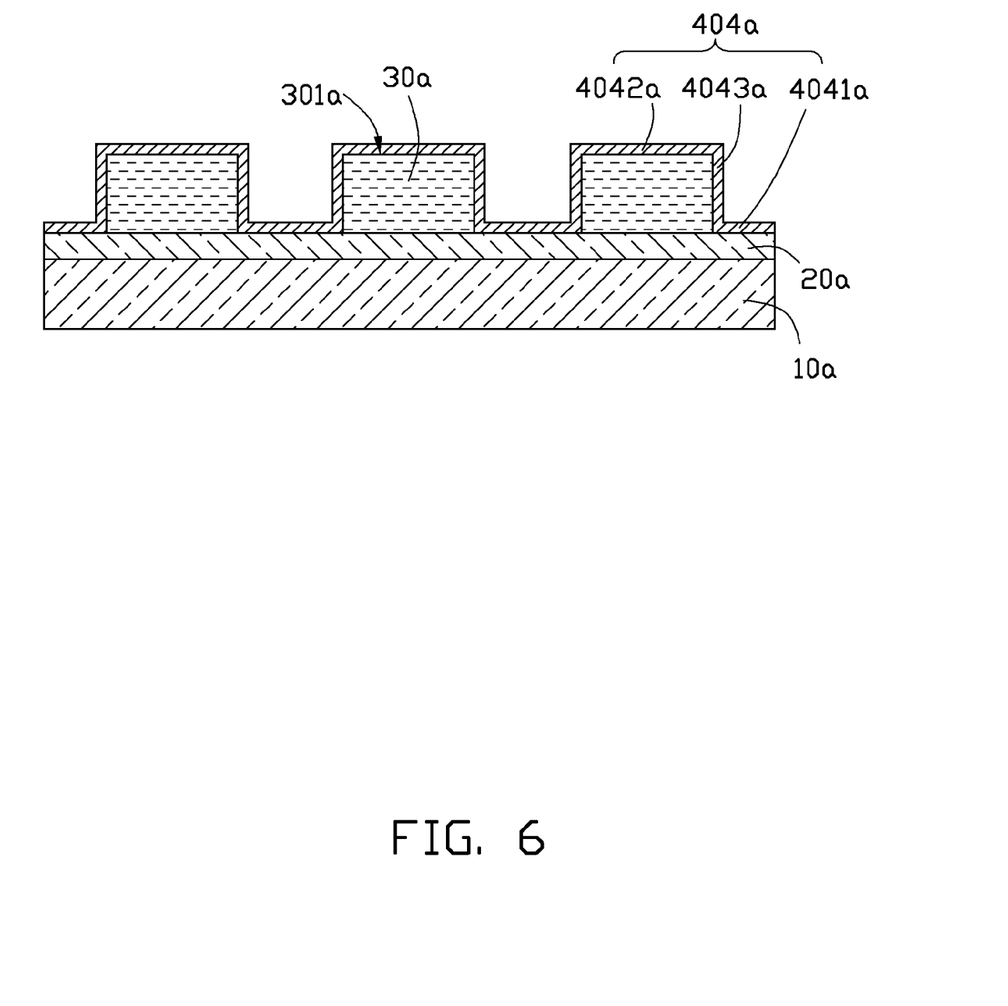

A light blocking layer $404a$ is formed over the member $10a$ and side surfaces of the ceramic power layers $30a$. In the present embodiment, referring to FIG. 6, the light blocking layer $404a$ includes a first bottom portion $4041a$ formed on the member $10a$, a plurality of first top portions $4042a$ formed on the upper surfaces $301a$ of the ceramic power layers $30a$, and a plurality of first ring-shaped portions $4043a$ formed on the side surfaces of the ceramic power layers $30a$. The ring-shaped portions $4043a$ connect the first top portions $4042a$ with the first bottom portion $4041a$. The light blocking layer $404a$ is made of chromium (Cr). The light blocking layer $404a$ has a uniform thickness, and is formed on the member $10a$ and the ceramic power layers $30a$ by a sputtering process. In alternative embodiments, the light blocking layer $404a$ may instead be made of titanium nitride (TiN). In further alternative embodiments, the light blocking layer $404a$ may instead be made by an evaporation technique. In still further alternative embodiments, the first top portions $4042a$ may be omitted altogether.

Figure 7:
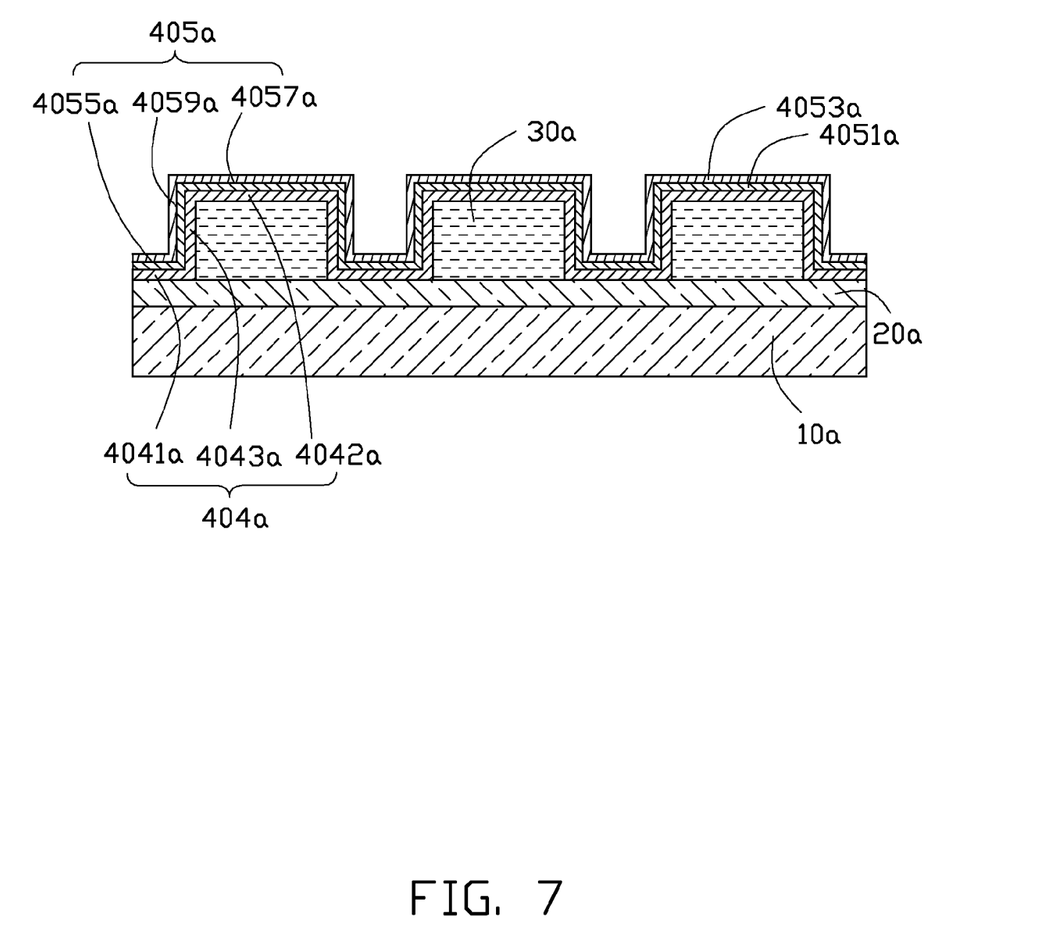

An electromagnetic shielding layer $405a$ is formed over the light blocking layer $404a$. In the present embodiment, referring to FIG. 7, the electromagnetic shielding layer $405a$ includes a second bottom portion $4055a$ formed on the first bottom portion $4041a$, a plurality of second top portions $4057a$ formed on the first top portions $4042a$, and a plurality of second ring-shaped portions $4059a$ formed on the side surfaces of the first ring-shaped portions $4043a$. The second ring-shaped portions $4059a$ connect the second top portions $4057a$ with the second bottom portion $4055a$. The top surfaces of the second bottom portions $4055a$, which face away from the member $10a$, are substantially coplanar with or lower than the upper surface $301a$ of the ceramic power layers $30a$. In the present embodiment, the electromagnetic shielding layer $405a$ has a uniform thickness, and is formed by a sputtering process; the top surfaces of the second bottom portions $4055a$, which face away from the member $10a$, are lower than the upper surface $301a$ of the ceramic power layers $30a$. The electromagnetic shielding layer $405a$ includes a copper layer $4051a$ formed over the light blocking layer $404$, and a stainless steel layer $4053a$ formed over the copper layer $4051a$. The copper layer $4051a$ has a uniform thickness, and the stainless steel layer $4053a$ also has a uniform thickness. In other embodiments, the second top portions $4057a$ may be omitted altogether.

Figure 8:
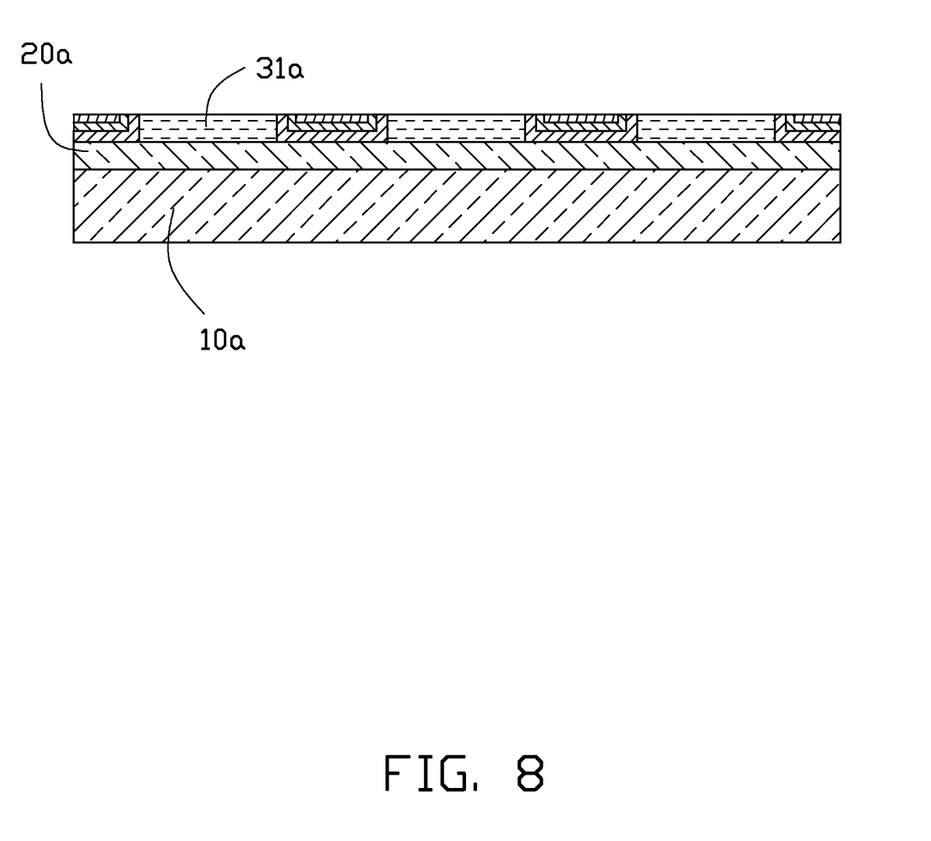

Referring to FIG. 8, a plurality of top portions of the ceramic power layers $30a$, which protrudes from the second bottom portions $4055a$, is removed from the member $10a$ by a grinding method, thereby exposing a plurality of remaining portions $31a$ of the ceramic power layers $30a$. In other embodiments, if the top surfaces of the second bottom portions $4055a$ are coplanar with the upper surface $301a$ of the ceramic power layers $30a$, a plurality of top portions, which protrudes out of the second bottom portions $4055a$, is removed from the member $10a$ by a grinding method, thereby exposing the ceramic power layers $30a$.

Figure 9:
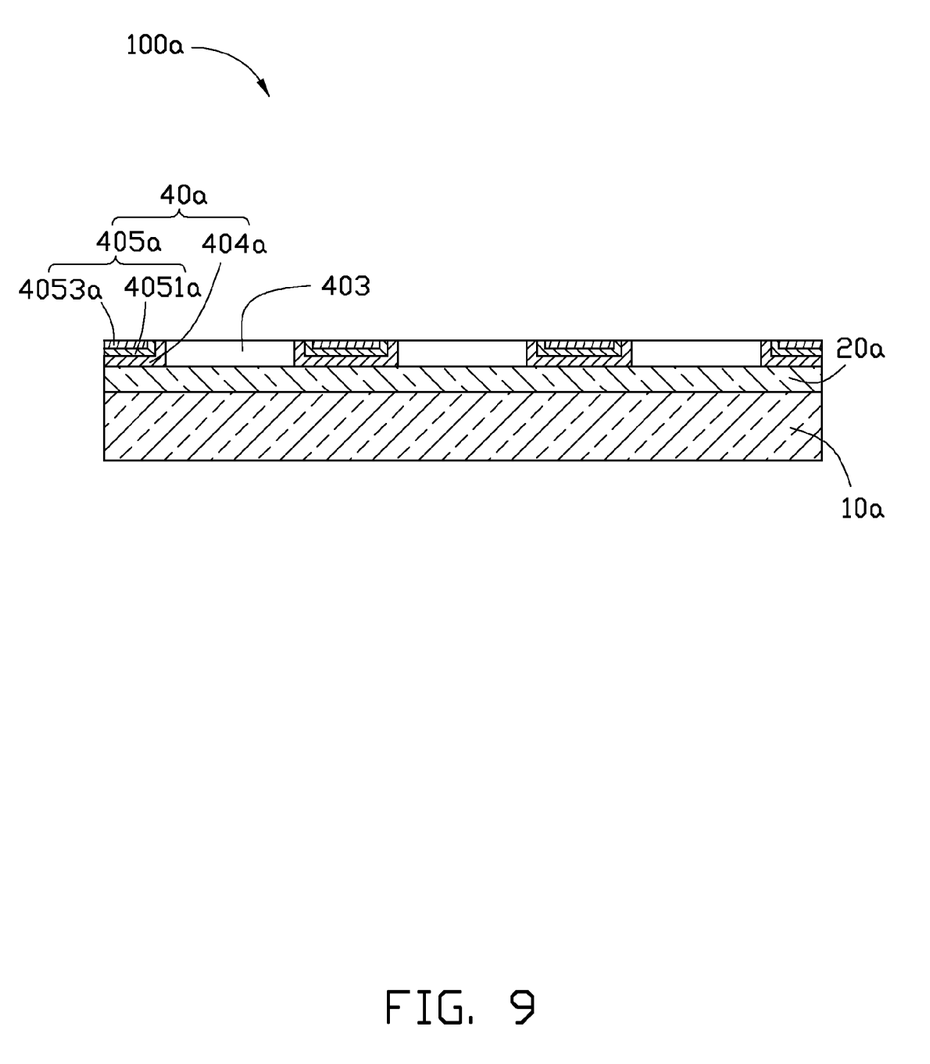

Referring to FIG. 9, the remaining portions $31a$ of the ceramic power layers $30a$ are removed from the member $10a$, thereby forming a plurality of through holes $403$ corresponding to the remaining portions $31a$. Thereby, a light blocking plate array $100a$ is obtained. In the present embodiment, the remaining portions $31a$ are removed from the member $10a$ by a grinding method. In alternative embodiments, the remaining portions $31a$ are removed from the member $10a$ by alcohol, or by acetone, or by water. In further alternative embodiments, if the ceramic power layers $30a$ are exposed, the ceramic power layers $30$ may be removed from the flat plate-like light pervious member $10a$ by alcohol, or by acetone, or by water.

The light blocking plate array $100a$ is cut and diced into a plurality of light blocking plates $100$ (see FIG. 2).

In the method of making the light blocking plate $100$, the ceramic power body used as an auxiliary material is cured by laser hardening, and is removed by a grinding method, or by acetone, or by water, or by alcohol. Thus, expensive development processes are completely avoided. Accordingly, the cost of making the light blocking plate $100$ can be reduced. In addition, the light blocking plate $100$ not only absorbs stray light, but also prevents external electromagnetic waves interfering with the normal operation of the image sensor. Therefore, the imaging quality of a lens module (not shown) equipped with the light blocking plate $100$ is improved.

Figure 10:
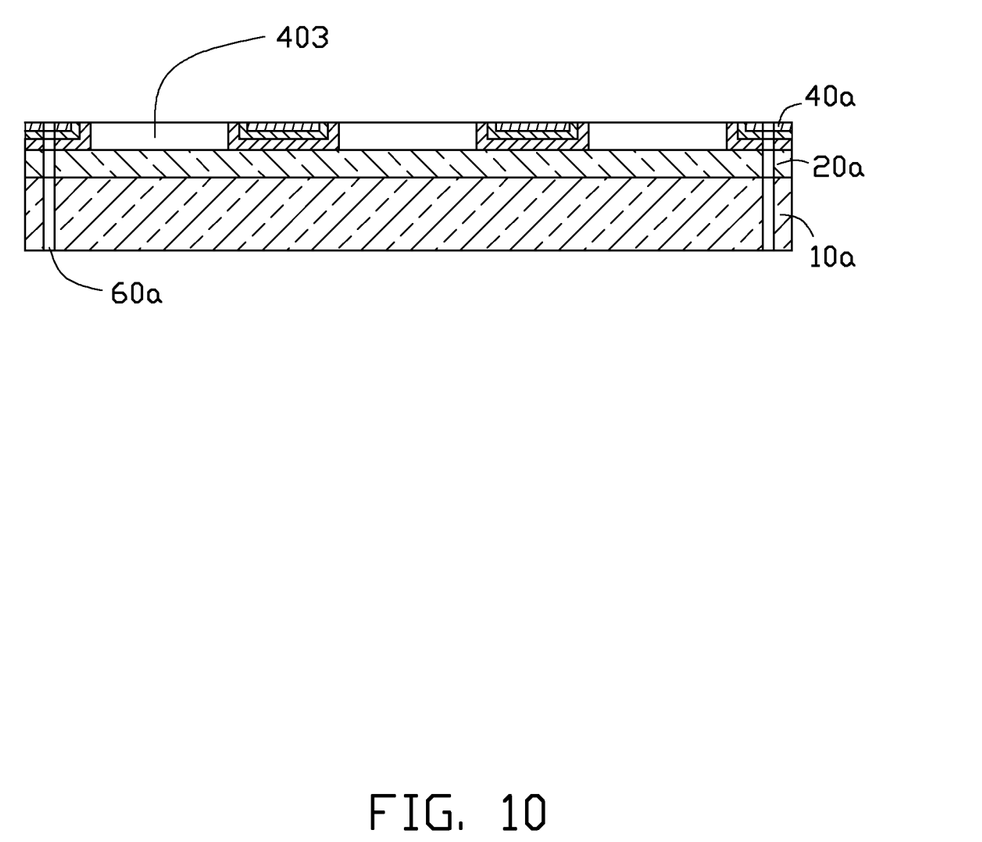

Referring to FIG. 10, in the present embodiment, in order to conveniently align the light blocking plate array $100a$ with a lens array (described below), the light blocking plate array $100a$ also defines two alignment holes $60a$ passing through the blocking and shielding $40a$, the filter film $20a$, and the member $10a$. In other embodiments, there may be three, four or more alignment holes $60a$.

Figure 11:
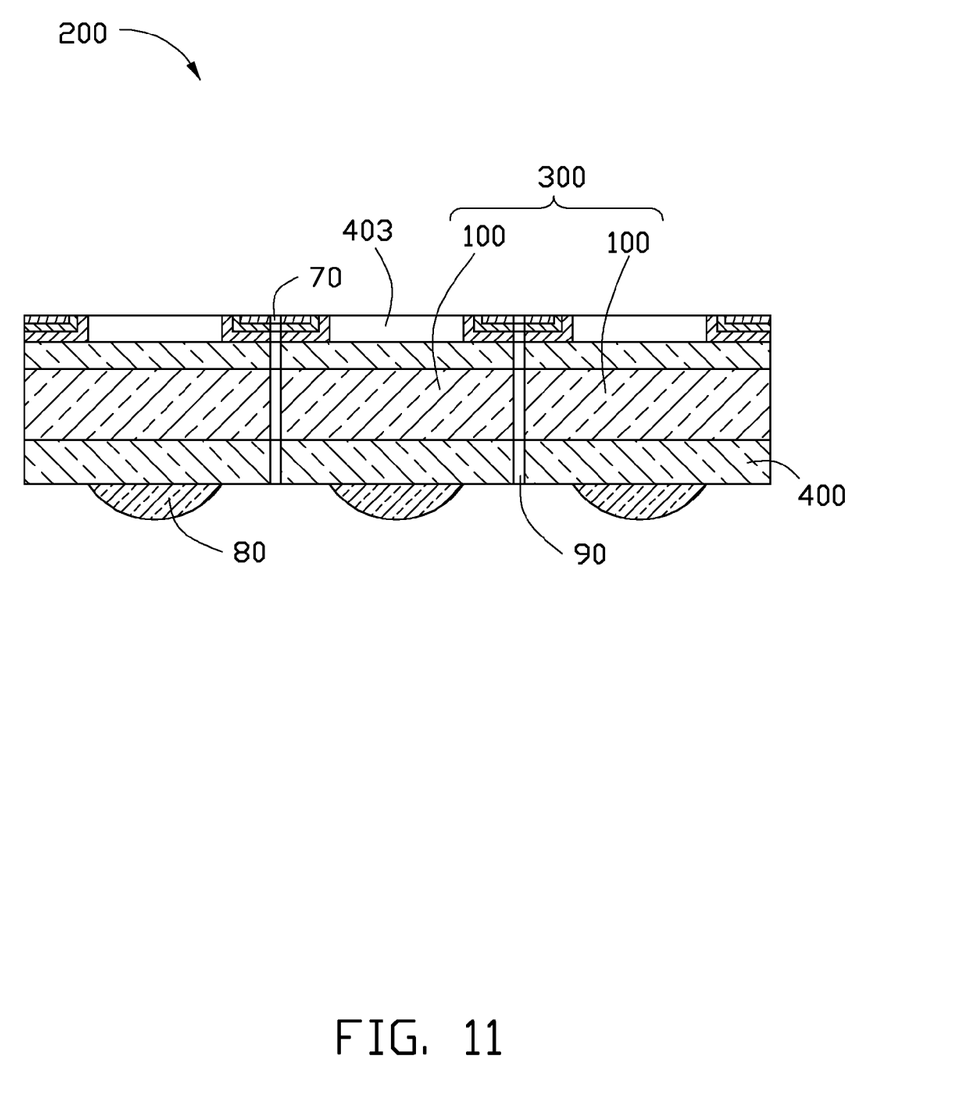
FIG. 11 is a schematic view of a lens module array according to a second embodiment.

Referring to FIG. 11, a lens module array $200$, in accordance with a second embodiment, is shown. The lens module array $200$ includes a light blocking plate array $300$ having a plurality of light blocking plates $100$, and a lens array $400$ with the light blocking plate array $300$ attached thereto.

The method for making the light blocking plate array $300$ is similar to the method for making the light blocking plate array $100a$, except that there is an alignment hole $70$ between any two through holes $403$.

The lens array $400$ includes a plurality of lenses $80$ spatially corresponding to the through holes $403$, and a plurality of alignment structures $90$. In the present embodiment, the alignment structures $90$ are holes. In other embodiments, the alignment structures $90$ may be protrusions.

Figure 12:
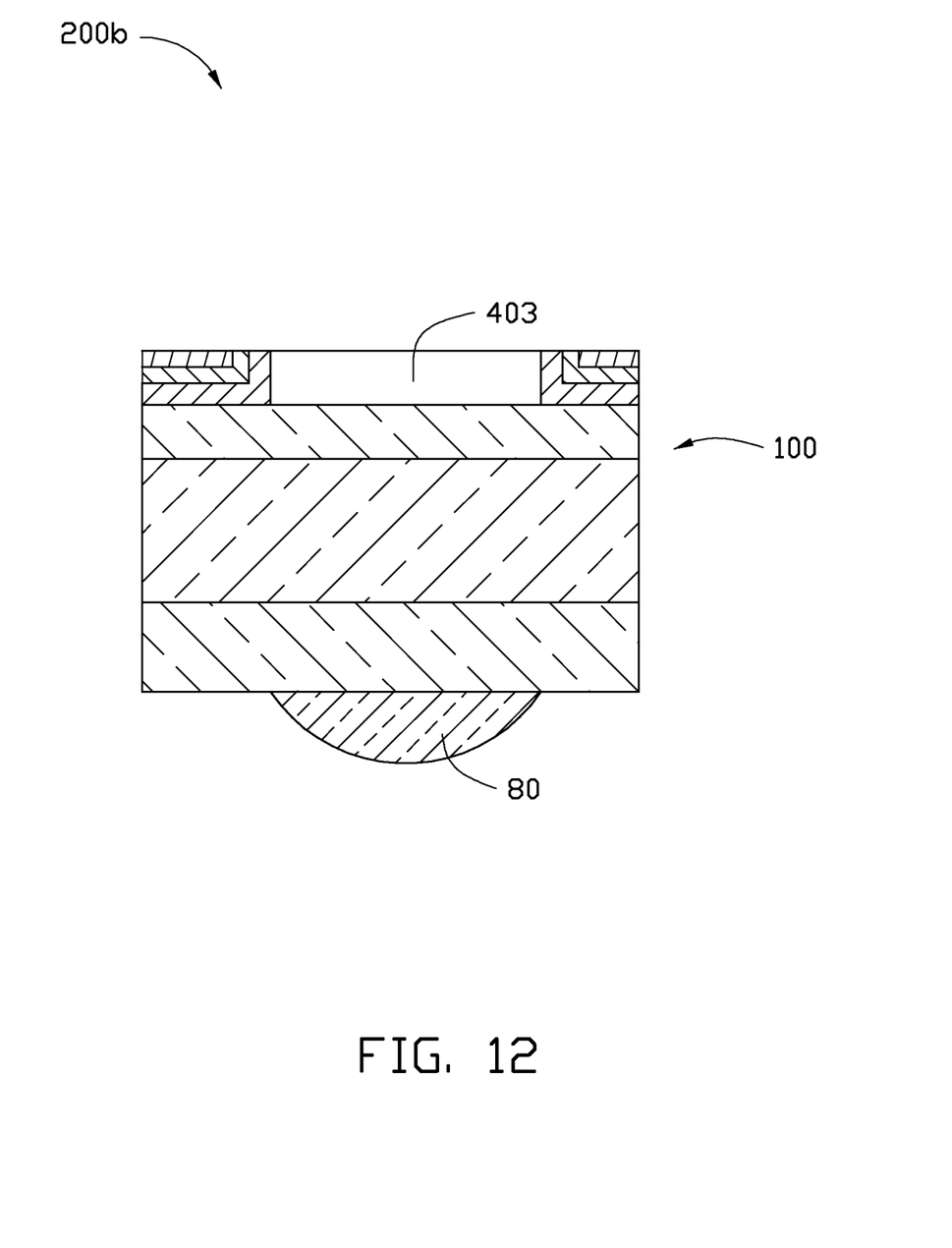
FIG. 12 is a schematic view of a lens module obtained by dicing the lens module array of FIG. 11.

When the light blocking plate array $300$ is attached to the lens array $400$, the alignment holes $70$ align with the alignment structures $90$, thereby making the through holes $403$ coaxial with the lenses $80$. Finally, a plurality of lens modules $200b$ (see FIG. 12) can be obtained by cutting and dicing the light blocking plate array $300$ attached to the lens array $400$. Each of the lens modules $200b$ includes a lens $80$, and a light blocking plate $100$ attached to the lens $80$.

While certain embodiments have been described and exemplified above, various other embodiments will be apparent to those skilled in the art from the foregoing disclosure. The disclosure is not to be limited to the particular embodiments described and exemplified but is capable of considerable variation and modification without departure from the scope and spirit of the appended claims.

What is claimed is:

1. A method for making a light blocking plate, comprising:

- providing a light pervious member being flat-plate-shaped;
- forming a plurality of spaced ceramic power layers on the light pervious member, wherein each of the plurality of spaced ceramic power layers is made of a composition comprising silicon dioxide in an amount by weight from 40 percent to 45 percent, aluminum phosphate in an amount by weight from 5 percent to 10 percent, and water in an amount by weight from 45 percent to 50 percent;
- forming a light blocking layer over the light pervious member, and top portions and side faces of the plurality of spaced ceramic power layers;
- forming an electromagnetic shielding layer having a uniform thickness over the light blocking layer;
- removing the top portions of the plurality of spaced ceramic power layers with remaining portions of the plurality of spaced ceramic power layers exposed to an outside;
- removing the remaining portions of the ceramic power layers.

* * * * *